United States Patent
Jan Wyszka et al.

(10) Patent No.: US 10,984,598 B2
(45) Date of Patent: Apr. 20, 2021

(54) METHOD, DEVICE, AND COMPUTER-READABLE STORAGE MEDIUM WITH INSTRUCTIONS FOR CONTROLLING A DISPLAY OF AN AUGMENTED REALITY HEAD-UP DISPLAY DEVICE

(71) Applicant: Volkswagen Aktiengesellschaft, Wolfsburg (DE)

(72) Inventors: Robert Jan Wyszka, Hannover (DE); Vitalij Sadovitch, Braunschweig (DE); Michael Wittkämper, Braunschweig (DE); Johannes Tümler, Wellen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/894,374

(22) Filed: Feb. 12, 2018

(65) Prior Publication Data
US 2018/0232956 A1  Aug. 16, 2018

(30) Foreign Application Priority Data
Feb. 13, 2017  (DE) .................. 10 2017 202 225.6

(51) Int. Cl.
*G06T 19/00*  (2011.01)
*G01C 21/36*  (2006.01)
(Continued)

(52) U.S. Cl.
CPC .......... *G06T 19/006* (2013.01); *G01C 21/365* (2013.01); *G01C 21/3632* (2013.01);
(Continued)

(58) Field of Classification Search
CPC .................. G06T 19/006; G02B 27/01; G02B 2027/0141; G02B 2027/014;
(Continued)

(56) References Cited

U.S. PATENT DOCUMENTS

| | | | | |
|---|---|---|---|---|
| 2003/0210228 A1* | 11/2003 | Ebersole | .............. | G02B 27/017 345/157 |
| 2007/0024644 A1* | 2/2007 | Bailey | ..................... | G06F 3/011 345/633 |

(Continued)

FOREIGN PATENT DOCUMENTS

| | | | | |
|---|---|---|---|---|
| CN | 102759360 A | 10/2012 | ............. | G01C 21/34 |
| DE | 102014013408 A1 | 4/2015 | ............... | B60R 1/10 |

(Continued)

OTHER PUBLICATIONS

Holloway, Richard L., "Registration Error Analysis for Augmented Reality," Presence: Teleoperators and Virtual Environments, vol. 6, No. 4, 21 Pages, 1997.

(Continued)

*Primary Examiner* — Jennifer Mehmood
*Assistant Examiner* — Kim Thanh T Tran
(74) *Attorney, Agent, or Firm* — Slayden Grubert Beard PLLC

(57) ABSTRACT

A method, a device and a computer-readable storage medium with instructions for controlling a display of an augmented reality head-up display device for a motor vehicle as well as an augmented reality head-up display device for a motor vehicle. In a first step, the position for a representation of a virtual object in front of the motor vehicle is determined (20). The virtual object is then superimposed (21), corresponding to the determined position, onto a projection surface by an imaging unit. To increase the subjective perception of the registration quality on the part (Continued)

of the observer, the virtual object is designed to this effect to be fault-tolerant with regard to registration errors.

18 Claims, 6 Drawing Sheets

(51) Int. Cl.
    *G06F 3/01* (2006.01)
    *G02B 27/01* (2006.01)
(52) U.S. Cl.
    CPC ............ *G02B 27/01* (2013.01); *G06F 3/011* (2013.01); *G01C 21/3658* (2013.01); *G02B 2027/0141* (2013.01)
(58) Field of Classification Search
    CPC ............ G02B 27/0101; G01C 21/3658; G01C 21/3647; G01C 21/365; G01C 21/3632; G01C 21/3602; G06F 3/011
    USPC ........................................................ 345/633
    See application file for complete search history.

(56) References Cited

U.S. PATENT DOCUMENTS

| | | | | |
|---|---|---|---|---|
| 2007/0279317 | A1* | 12/2007 | Matsumoto | B60K 35/00 345/7 |
| 2015/0084988 | A1* | 3/2015 | Lee | B60W 40/072 345/633 |
| 2016/0000515 | A1* | 1/2016 | Sela | G06T 7/337 600/424 |
| 2016/0240012 | A1* | 8/2016 | Gruenler | G06T 19/006 |
| 2017/0169612 | A1* | 6/2017 | Cashen | G06T 19/20 |
| 2018/0024562 | A1* | 1/2018 | Bellaiche | A61K 36/906 |
| 2018/0129050 | A1 | 5/2018 | Hayashi et al. | |
| 2018/0185100 | A1* | 7/2018 | Weinstein | A61B 34/20 |

FOREIGN PATENT DOCUMENTS

| | | | | |
|---|---|---|---|---|
| EP | 3031656 | A1 | 6/1916 | ............ B60K 35/00 |
| EP | 2703873 | A2 | 3/2014 | ............ G01C 21/36 |
| JP | 2005215879 | A | 8/2005 | ............ B60R 16/02 |
| JP | 3932127 | B2 | 6/2007 | ............ B60R 16/20 |
| KR | 20150055183 | A | 5/2015 | ............ G02B 27/01 |
| WO | 2017/079162 | A1 | 5/1917 | ............ G02B 27/01 |
| WO | 2016/185563 | A1 | 5/1918 | ............ G02B 27/01 |
| WO | 2015/049029 | A1 | 4/2015 | ............ G01C 21/36 |

OTHER PUBLICATIONS

German Office Action, Application No. 10201720225.6, 7 pages, dated Nov. 20, 2017.

European Search Report, Application No. 18153335.7, 8 pages, dated Jun. 13, 2018.

Chinese Office Action, Application No. 201810149290.4, 16 pages, dated Feb. 7, 2020.

European Office Action, Application No. 18153335.7, 5 pages, dated Aug. 28, 2020.

* cited by examiner

METHOD, DEVICE, AND COMPUTER-READABLE STORAGE MEDIUM WITH INSTRUCTIONS FOR CONTROLLING A DISPLAY OF AN AUGMENTED REALITY HEAD-UP DISPLAY DEVICE

CROSS REFERENCE TO RELATED APPLICATIONS

This application claims priority to DE Application No. 10 2017 202 225.6 filed Feb. 13, 2017 with the German Patent and Trademark Office, the contents of which application are hereby incorporated by reference in their entireties.

TECHNICAL FIELD

The present invention relates to a method, a device and a computer-readable storage medium with instructions for controlling a display of an augmented reality head-up display device for a motor vehicle. The invention further relates to an augmented reality head-up display device for a motor vehicle as well as a motor vehicle in which a method according to the invention, a device according to the invention or an augmented reality head-up display device according to the invention is used.

BACKGROUND

With the steady development of virtual and augmented reality technologies and applications, these are finding their way into the automobile. In the case of augmented reality (AR), in German "erweiterte Realität," it relates to enriching the real world with virtual elements that are registered in three-dimensional space in the correct location and allow real-time interaction. Since the expression "augmented reality" as opposed to "erweiterte Realität" has been adopted by experts in the German-speaking world, the former will be used in the following.

The head-up display (HUD) offers a possible technical realization to enrich the driver's working space with perspectively correct virtual extensions. Here the light rays of a display built into the dashboard are bent by multiple mirrors and lenses and are shined into the driver's eye via a projection surface so that he receives a virtual picture outside of the vehicle. In the automotive field, the front window, the curved form of which must be taken into account in the representation, often serves as a projection surface. As an alternative, often an additional sheet of glass or plastic arranged on the dashboard between the driver and the front window also is used. Due to the optical overlap of the display and the driving scene, fewer head and eye movements are necessary to see the information. Moreover, the adaptation effort for the eyes is reduced since, depending on the virtual distance of the display, it has to be accommodated less or not at all. Current series HUDs, however, are limited to displays directly in the primary sight area of the driver and contain redundant information, such as the speedometer, which is also found in other places in the cockpit. This display technology reduces occurrences of looking away from the street but continues to have the disadvantage that the presented information needs to be interpreted and transferred to the real situation, since it is not registered in the real scene. In complex situations, this presents a mentally challenging cognitive process. By marking objects and superimposing information at their real reference point, i.e., via a contact analog representation, environment-related information can be directly represented in the field of view of the driver. This direct graphical enrichment of the environment in the form of augmented reality can reduce the cognitive transfer demands considerably.

Augmented reality offers various application possibilities for supporting the driver through contact analog marking of street lanes and objects. Relatively obvious examples are mostly related to the area of navigation. While classic navigation displays in conventional HUDs typically show schematic representations, for example an arrow pointing at a right angle to the right as an indicator to turn right at the next opportunity, AR displays offer substantially more effective possibilities. Since the displays can be displayed as a "part of the environment," extremely fast and intuitive interpretations by the user are possible.

A registration of the virtual information in the real field of view of the driver in the sense of augmented reality places high demands on the technical implementation. In order to be able to represent virtual contents at the correct location and perspectively correctly in reality, very detailed knowledge of the surroundings and individual motion of the vehicle is necessary.

Knowledge of the environment is available, for example, in the form of digital maps and in addition can be generated through environmental detection of the vehicle by sensors, wherein a car-2-car communication is required for the latter. In both cases, limitations of the precision must be assumed. For example, the map material nowadays is largely two-dimensional and contains no or only very inexact height profile of the street. The detection by sensors of the environment, however, is subject to the limitations of the sensors as well as influences from the surroundings and environment. For example, the width of a street lane can only be determined reasonably precisely when lane markings are present.

The location of the vehicle is also, for example, dependent on the GPS quality (GPS: Global Positioning System). Differential GPS offers a precision of only about 3 m. Additionally, the position of the vehicle in three-dimensional space, which constantly changes due to pitching, rolling and yawing movements, is also relevant for a perspectively correct virtual superimposition. Detection via rotation-rate and acceleration sensors is possible and sufficiently precise. However, this knowledge is only helpful in combination with detailed knowledge of the curvature profile of the street, since vehicle movements relative to the street must be compensated for when using an AR display.

There are a number of influencing factors along the information processing chain that lead to discrepancies between virtual superimpositions and real objects and consequently reduce the quality of the overlay or respectively extension of the real scene. Among others, mention can be made of detection errors within the scope of the detection of the surroundings by sensors, errors during tracking, for example during vehicle location or driver observation, errors during rendering, i.e. during generation of the virtual objects to be superimposed, errors during projection, for example via incorrectly calibrated components in the HUD, or also errors during observation on the part of the driver caused, for example, by the visual perception, the attention or the expectation of the driver.

So-called registration errors that emerge due to the described influencing factors and that are reflected in a false positioning of the virtual contents in the real scene can occur in six degrees of freedom:

Degrees of freedom of the positioning: X, Y, Z

Degrees of freedom of the orientation: yaw, pitch, roll

These error types can occur statically, without any movement of the ego vehicle or objects in the scene. Due to latencies in the information processing chain, however, a dynamic occurrence is also possible when objects in the scene or the ego vehicle move. Latencies are the strongest influencing factor for registration errors.

In view of this, WO 2017/079162 A1 describes a method for representing virtual objects in augmented reality systems, virtual reality systems or immersive display systems for the realistic representation of a wide field of view in which the images of the virtual objects can be corrected in order to allow a reduction in registration errors with regard to real objects or places. The correction occurs in particular on the basis of an optical distortion.

The article R. L. Holloway: "Registration Error Analysis for Augmented Reality," Presence: Teleoperators and Virtual Environments, vol. 6 (1997), pages 413-432, describes an end-to-end error analysis of a tool for operations planning that is based on a see-through head-mounted display. The analysis uses a mathematical model of the system and makes it possible to analyze the sensitivity of a system registration error with regard to errors in each part of the system.

Typically, an attempt is made to reduce the objectively measurable static or dynamic registration errors by optimizing the hardware or software. Such optimizations are regularly very costly.

For example, DE 10 2014 013 408 A1, describes a method for representing information about the surroundings of a vehicle in which real optical information about the surroundings are overlaid with virtual image data. By means of at least one detection unit, a street surface in front of the vehicle in the direction of travel is detected and a height characteristic is recognized. Depending on the height characteristic, a future individual motion of the vehicle is predicted, and depending on the future individual motion, the virtual image data are represented in the correct position overlaid over the real optical information about the surroundings.

SUMMARY

An object exists to provide alternative solutions for controlling a display of an augmented reality head-up display device for a motor vehicle that increase the subjective perception of the registration quality on the part of the observer in a cost-effective manner.

The object is solved by a method as claimed, by a device as claimed, a computer-readable storage medium with instructions as claimed, and by an augmented reality head-up display device as claimed. Various embodiments of the invention are the subject of the dependent claims and the following description.

According to a first aspect, a method for controlling a display of an augmented reality head-up display device for a motor vehicle comprises the following steps:
Determining a position for a representation of a virtual object in front of the motor vehicle; and
Superimposing the virtual object corresponding to the determined position, wherein the virtual object is designed to this effect to be fault-tolerant with regard to registration errors so that registration errors appear less saliently.

According to a further aspect, a device for controlling a display of an augmented reality head-up display device for a motor vehicle comprises:

A positioning unit for determining a position for a representation of a virtual object in front of the motor vehicle; and
A rendering unit for superimposing the virtual object corresponding to the determined position, wherein the virtual object is designed to this effect to be fault-tolerant with regard to registration errors so that registration errors appear less saliently.

According to a further aspect, a computer-readable storage medium contains instructions that, when carried out by a computer, prompt the computer to carry out the following steps for controlling a display of an augmented reality head-up display device for a motor vehicle:
Determining a position for a representation of a virtual object in front of the motor vehicle; and
Superimposing the virtual object corresponding to the determined position, wherein the virtual object is designed to this effect to be fault-tolerant with regard to registration errors so that registration errors appear less saliently.

The concept of a computer is to be understood broadly. In particular, it also includes control devices and other processor-based data processing devices.

BRIEF DESCRIPTION OF THE DRAWINGS

The invention is explained in the following using various exemplary embodiments.

DETAILED DESCRIPTION OF EMBODIMENTS

Figure 1:
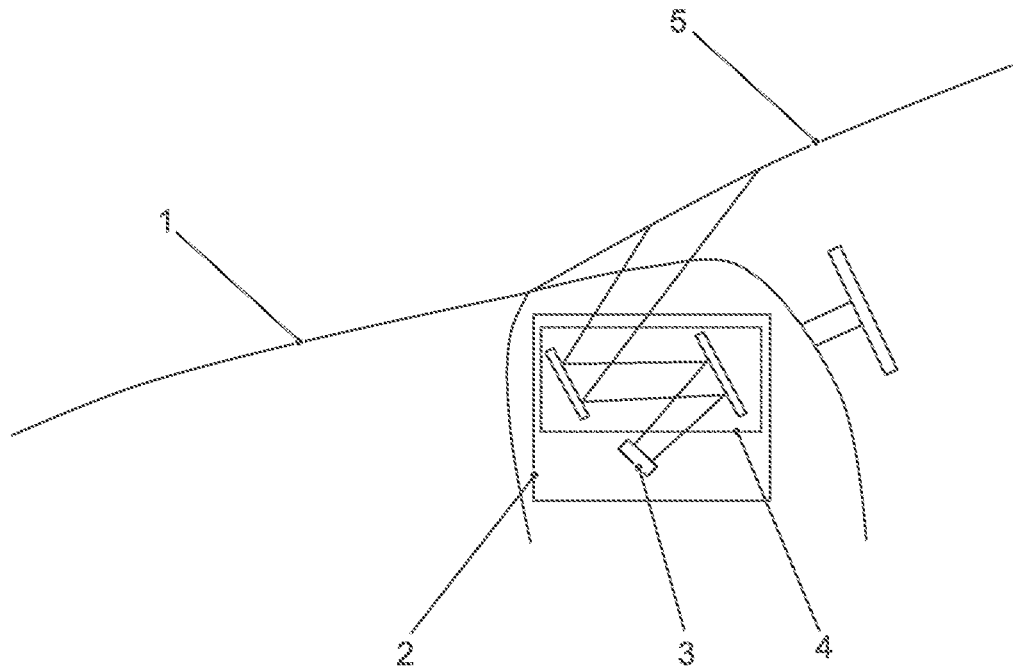
FIG. 1 shows schematically the general structure of a head-up display device for a motor vehicle.

To distinguish from the known approach to reducing the objectively measurable registration errors by optimizing the hardware or software, the solutions according to some embodiments address the perception of the observer and raise the subjective perception of the registration quality. For this purpose, the subjective impression of the registration quality is influenced by an adjusted, fault-tolerant display design. A fault-tolerant design of AR contents is more forgiving with respect to registration errors and compensates for these in the subjective perception of the observer.

According to some embodiments, the virtual object marks a navigation path, wherein the width of the virtual object is narrower than the width of the lane highlighted by the navigation path. With the reduction of the width of the virtual element, a certain abstraction from the real lane geometry is achieved. The result of this is that the contours of the virtual object, for example a flat representation of the navigation path, intersect the lane markings only in the case of a pronounced registration error. Additionally, in this way the virtual object takes up less space and as a result protrudes also with less space over the lane to be marked in the case of a registration error. The result of this is that the error appears less saliently, i.e., is less noticeable.

According to some embodiments, the virtual object marks a navigation path, wherein the virtual object is divided into discrete elements. With the division of the virtual object into multiple discrete elements or sections, a reduction of the space taken up by the virtual object can be provided. For example, a flat representation of a navigation path can be divided into a series of stripes. Such a divided virtual object continues to be perceived by the observer as a continuous object since the human brain is capable of unconsciously complementing continuous patterns. This visual perception phenomenon can be explained by the gestalt laws of perception psychology. A benefit of this representation is, with constant width of the virtual object, the smaller space that lies on the neighboring lane when registration errors occur. Additionally, the width of the virtual object can naturally also be reduced.

According to some embodiments, the discrete elements convey additional information. The approach of dividing the virtual object can be extended by providing the virtual object with an additional informational content with the help of symbols of the individual parts. For example, the discrete elements can be arranged in the form of an arrow. The additional symbols contribute to the intuitive understanding of the display. Moreover, this type of display is also fault-tolerant with regard to a further registration error, namely the up-and-down movements of the display caused by pitching movements of the vehicle. Since the person knows symbols painted on the street, he knows from experience that these symbols normally stick to the street stably. Subjectively, the driver perceives the movements of the virtual symbols less since these movements contradict the behavior to which he is accustomed.

According to some embodiments, the virtual object or the discrete elements have fuzzy edges. Additionally to or instead of the possibility to change the geometry of the virtual object, it is also possible in some embodiments to form the contours of the virtual object or respectively of the discrete elements more softly. A fuzzy representation of the contours leads to an area of the same size protruding over the neighboring lane when the size of the virtual object stays the same. However, in this case the overlap is less salient.

In some embodiments, an augmented reality head-up display device as discussed herein, a method as discussed herein or a device as discussed herein is used in a self-driving or manually controlled vehicle, for example a motor vehicle.

Further features of the present invention are made apparent in the following description of further embodiments in connection with the figures and the attached claims.

For better understanding of the principles of the present invention, further embodiments are illustrated in more detail in the following. It is noted that the invention is not limited to these or any other embodiments and that the described features can also be combined and modified without leaving the scope of the invention as determined in the attached claims.

FIG. 1 shows schematically an augmented reality head-up display device 2 for a motor vehicle 1 with the help of which contents can be shown on a projection surface 5 of the motor vehicle 1, for example on the front window or on an additional sheet of glass or plastic arranged on the dashboard between the driver and the front window. The displayed contents are generated by an imaging unit 3 and projected onto the projection surface 5 with the help of an optical module 4. Typically, the projection occurs in an area of the front window above the steering wheel. The imaging unit 3 can be, for example, an LCD-TFT display. The augmented reality head-up display device 2 is generally built into a dashboard of the motor vehicle 1.

Figure 2:
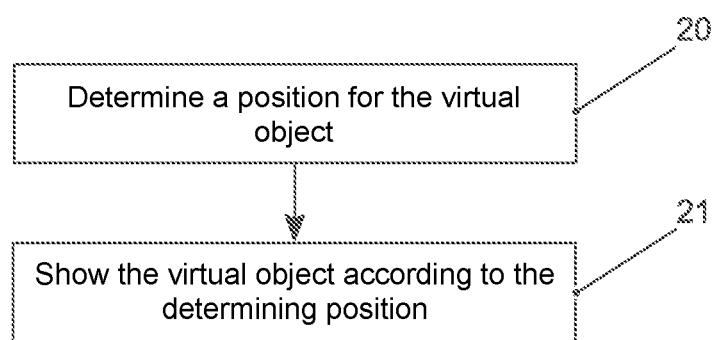
FIG. 2 shows schematically a method for controlling a display of an augmented reality head-up display device for a motor vehicle.

FIG. 2 shows schematically a method for controlling a display of an augmented reality head-up display device for a motor vehicle. In a first step, a position for the representation of a virtual object in front of the motor vehicle is determined 20. The virtual object is then superimposed, corresponding to the determined position, onto a projection surface by an imaging unit 21. To increase the subjective perception of the registration quality on the part of the observer, the virtual object is designed to be fault-tolerant with regard to registration errors.

Figure 3:
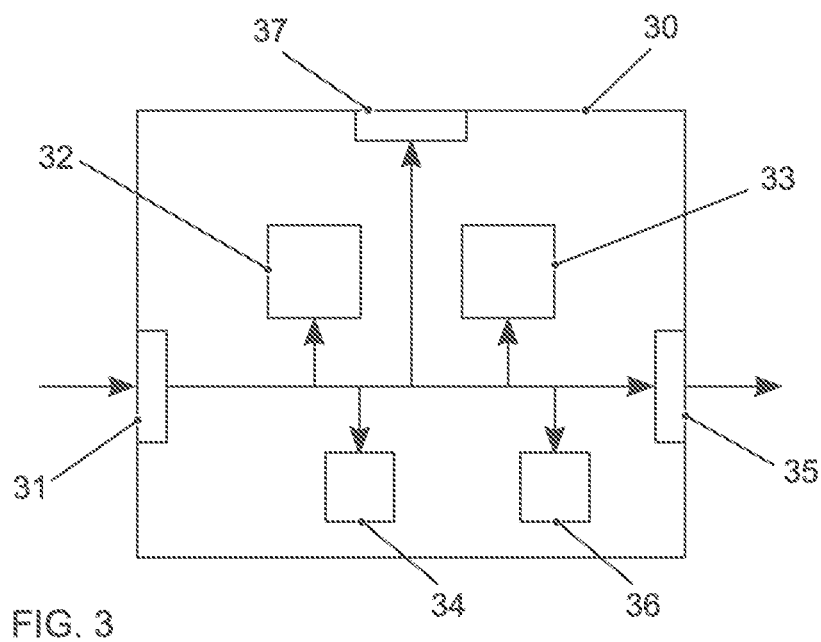
FIG. 3 shows a first embodiment of a device for controlling a display of an augmented reality head-up display device for a motor vehicle.

FIG. 3 shows a simplified schematic representation of a first embodiment of a device 30 for controlling a display of an augmented reality head-up display device for a motor vehicle. The device 30 can be part of the augmented reality head-up display or connected to it through a data connection. The device 30 has an input 31 for receiving data which allow a determination of a desired position for the representation of a virtual object in front of the motor vehicle. From the received data, a positioning unit 32 determines the desired position for the virtual object. A rendering unit 33 then superimposes the virtual object, corresponding to the determined position, onto a projection surface with the help of an imaging unit. The data generated by the rendering unit 33 are made available to the imaging unit via an output 35 of the device 30. The positioning unit 32 and the rendering unit 33 can be controlled by a control unit 34. Settings of the positioning unit 32, the rendering unit 33 or the control unit 34 can also be changed via a user interface 37. For this purpose, the data obtained by the device 30 can be stored on a storage device 36 of the device 30, for example for later analysis. The positioning unit 32, the rendering unit 33 as well as the control unit 34 can be realized as dedicated hardware, for example as integrated circuits. Naturally, however, they can also be partially or fully combined or implemented as software that runs on an appropriate processor. The input 31 and the output 35 can be implemented as separate interfaces or as a combined bidirectional interface.

Figure 4:
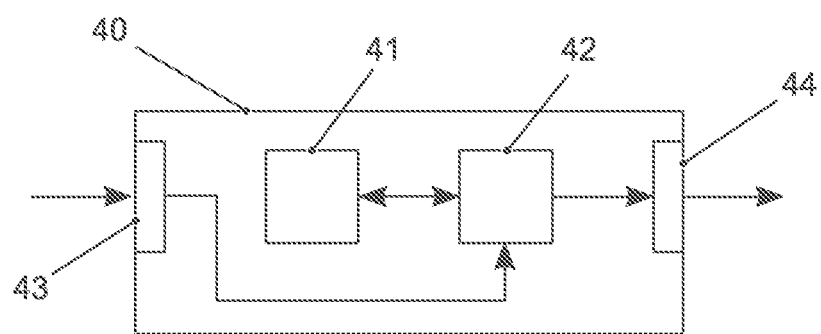
FIG. 4 shows a second embodiment of a device for controlling a display of an augmented reality head-up display device for a motor vehicle.

FIG. 4 shows a simplified schematic representation of a second embodiment of a device 40 for controlling a display of an augmented reality head-up display device for a motor vehicle. The device 40 in this case can also be part of the augmented reality head-up display device or connected to it through a data connection. The device 40 has a processor 42 and a storage device 41. For example, the device 40 relates to a computer or a control device. Instructions are stored on the storage device 41 that, when carried out by the processor 42, prompt the device 40 to carry out the steps according to one of the described methods. Therefore, the instructions stored on the storage device 41 embody a program executable by the processor 42 which the method according to some embodiments realizes. The device has an input 43 for receiving information. Data generated by the processor 42 are made available via an output 44. Additionally, they can be stored on the storage device 41. The input 43 and the output 44 can be combined into a bidirectional interface.

The processor 42 can comprise one or more processor units, for example microprocessors, digital signal processors or combinations thereof.

The storage devices 36, 41 of the described embodiments can have both volatile and non-volatile storage areas and comprise various storage devices and storage media, for example hard drives, optical storage media or semiconductor storage devices.

Figure 5:
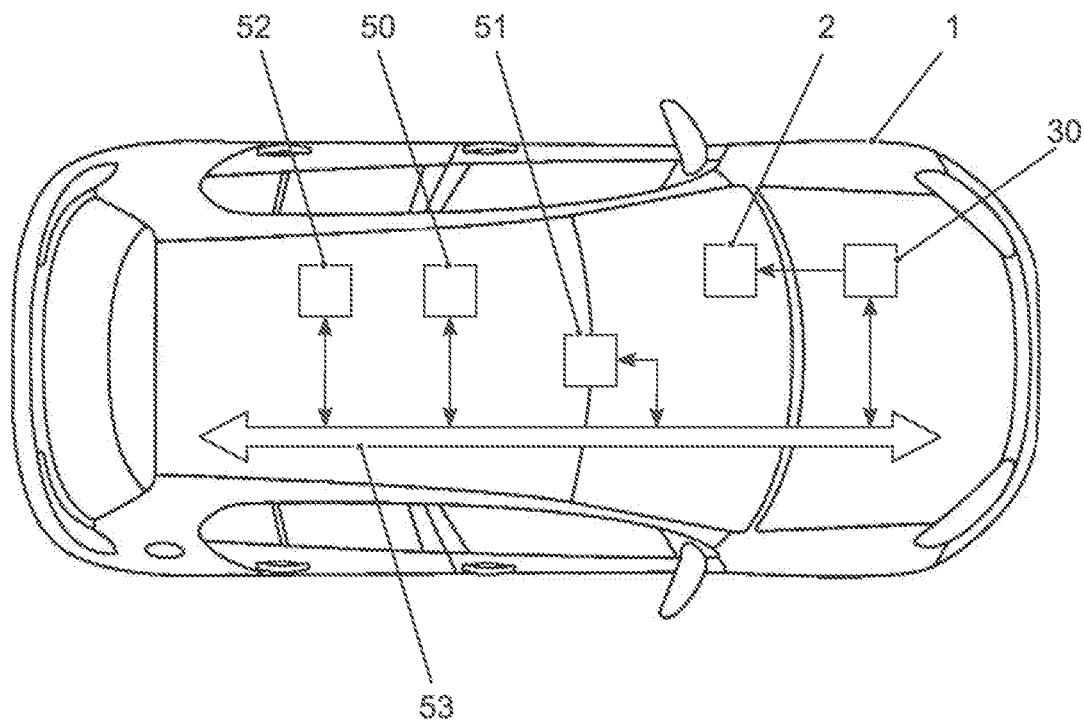
FIG. 5 represents schematically a motor vehicle in which a solution according to some embodiments is realized.

FIG. 5 represents schematically a motor vehicle 1 in which a solution according to some embodiments is realized. The motor vehicle has an augmented reality head-up display device 2 with which information is displayed on the front window of the motor vehicle 1 or on an additional sheet (not shown) arranged between the driver and the front window. The augmented reality head-up display device 2 is controlled by a device 30 for controlling the display of the augmented reality head-up display device 2. Additionally, the motor vehicle 1 has a navigation system 50 and an environment sensor system 51, for example a camera system. From the navigation data from the navigation system 50 or data from the environment sensor system 51, a virtual object is determined that is to be displayed by the augmented reality head-up display device 2. The device 30 controls the augmented reality head-up display device 2 corresponding to a position determined for the representation of the virtual object. The transfer of the data within the motor vehicle 1 occurs with the help of a network 53 to which further control devices 52 can be attached.

Figure 6:
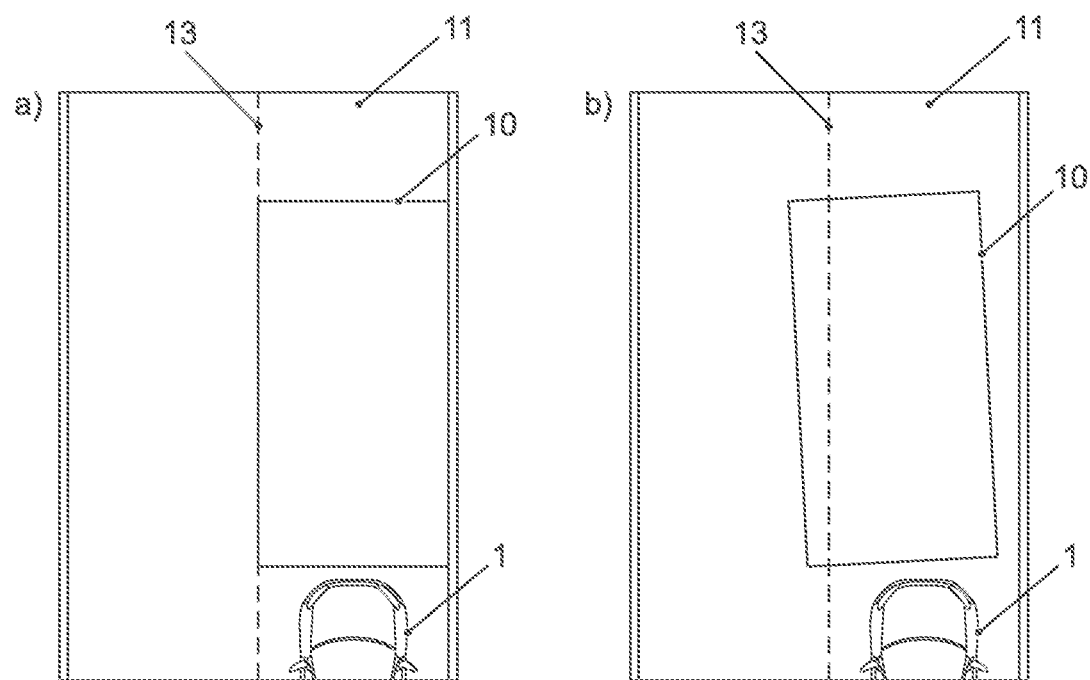
FIG. 6 illustrates a flat representation of a navigation path without and with a registration error.

FIG. 6 illustrates a bird's-eye view of a known contact analog navigation display in the form of a flat representation of a navigation path. This type of representation of a navigation path is also known as a carpet representation, whereby a virtual object 10 marks the entire width of the lane 11 to be driven in front of the vehicle 1 as a navigation indicator. FIG. 6a) shows the situation in the ideal condition, i.e., without registration errors. In FIG. 6b) there is a registration error, in this example in the form of a small rotation about the Z axis of the vehicle 1 and a lateral offset to the vehicle 1. As a result of the registration error, the virtual object 10 intersects the lane markings 13 on the street. Since this form of the representation is strongly oriented to the real geometries of the lane, the registration error appears very salient and disruptive.

In the following, on the basis of FIGS. 7 to 12, various possibilities are demonstrated for how the error tolerance of the virtual object can be achieved with regard to registration errors.

Figure 7:
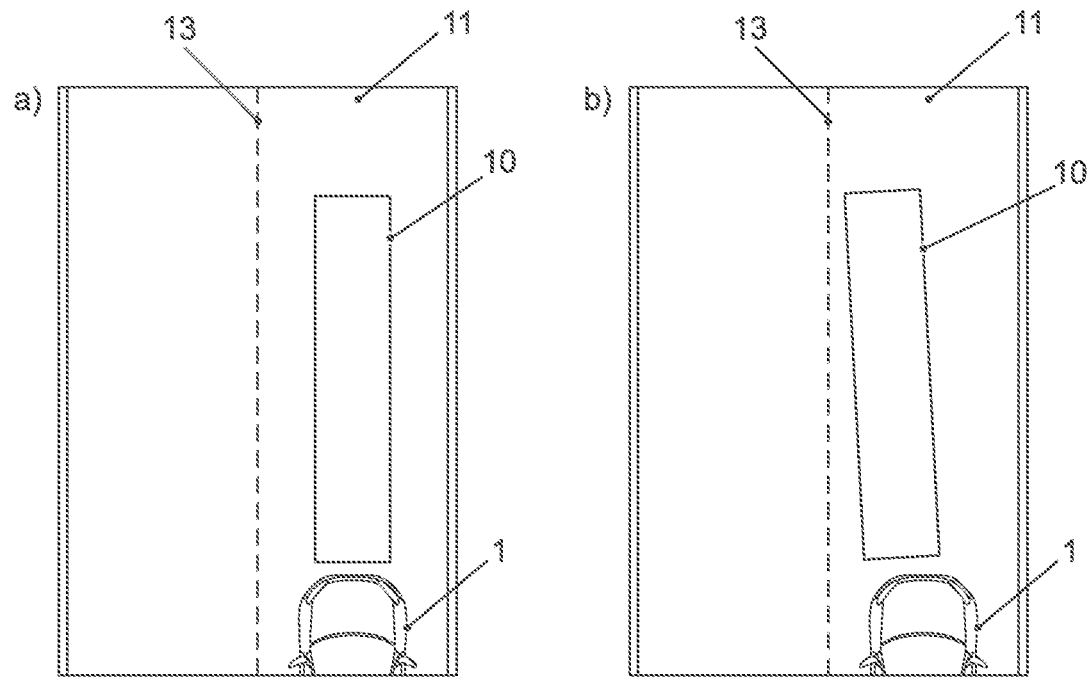
FIG. 7 illustrates a flat representation of a navigation path with reduced width, without and with a registration error.

FIG. 7 illustrates a flat representation of a navigation path with reduced width. FIG. 7a) shows the situation in the ideal condition, i.e., without registration errors. FIG. 7b) shows the already known registration error from FIG. 6b). By reducing the width of the virtual object 10 as compared to the carpet representation from FIG. 6, a certain abstraction from the real lane geometry is achieved. The result of this is that the contours of the virtual object 10 intersect the lane markings 13 only in the case of a pronounced registration error. Although the registration errors in FIG. 6b) and FIG. 7b) are identical, in FIG. 7b) the virtual object 10 still lies fully within the lane 11 to be marked. Additionally, the virtual object 10 takes up less space in this form of representation and as a result, protrudes also with less space over the lane 11 to be marked in the case of a registration error. The result of this is that the error appears less saliently.

Figure 8:
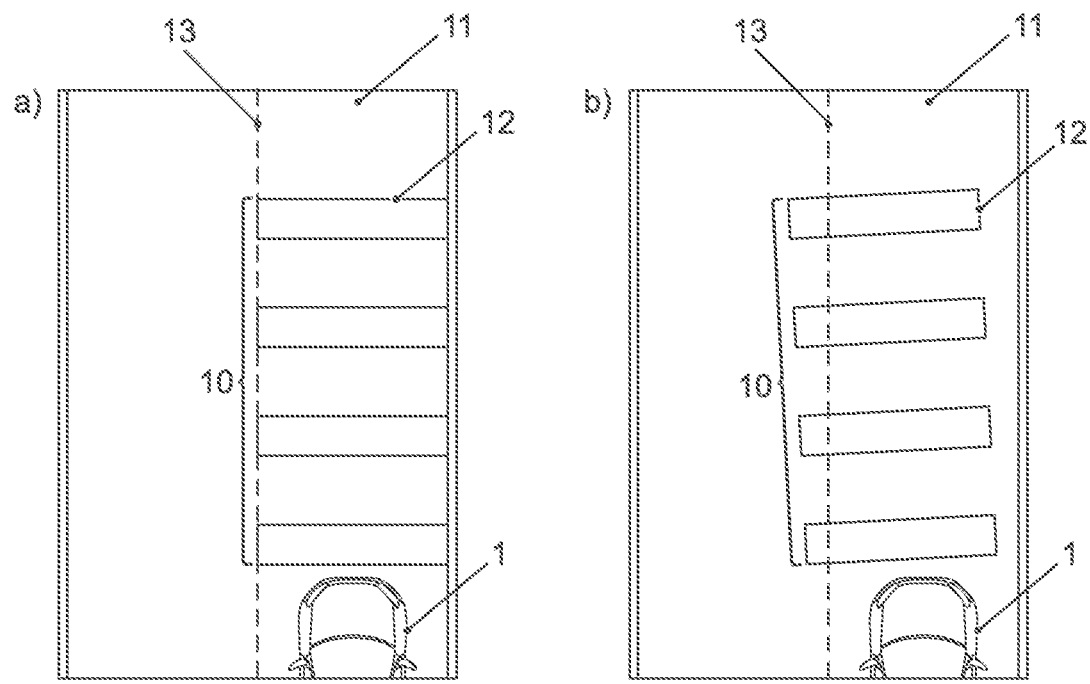
FIG. 8 illustrates a flat representation of a navigation path composed of discrete elements without and with a registration error.

FIG. 8 illustrates a flat representation of a navigation path composed of discrete elements. FIG. 8a) shows the situation in the ideal condition, i.e., without registration errors. FIG. 8b) shows once again the known registration error from FIG. 6b). If the form of the contours and the width of the virtual object 10 stay the same in comparison to the carpet representation from FIG. 6, the area of the virtual object 10 can be reduced by dividing the virtual object 10 into multiple sections. For this purpose, the virtual object 10 is composed of multiple elements 12. Since the human brain is capable of unconsciously complementing continuous patterns, the virtual object 10 continues to be perceived as a continuous object with appropriate division. This visual perception phenomenon can be explained with the gestalt laws of perception psychology (Law of Good Continuation, Law of Proximity, etc.). The advantage of this type of representation, as compared to the carpet representation from FIG. 6, is the smaller area that lies in the neighboring lane as a result of the registration error. Additionally, the width of the virtual object 10 or respectively its elements 12 can also be reduced.

Figure 9:
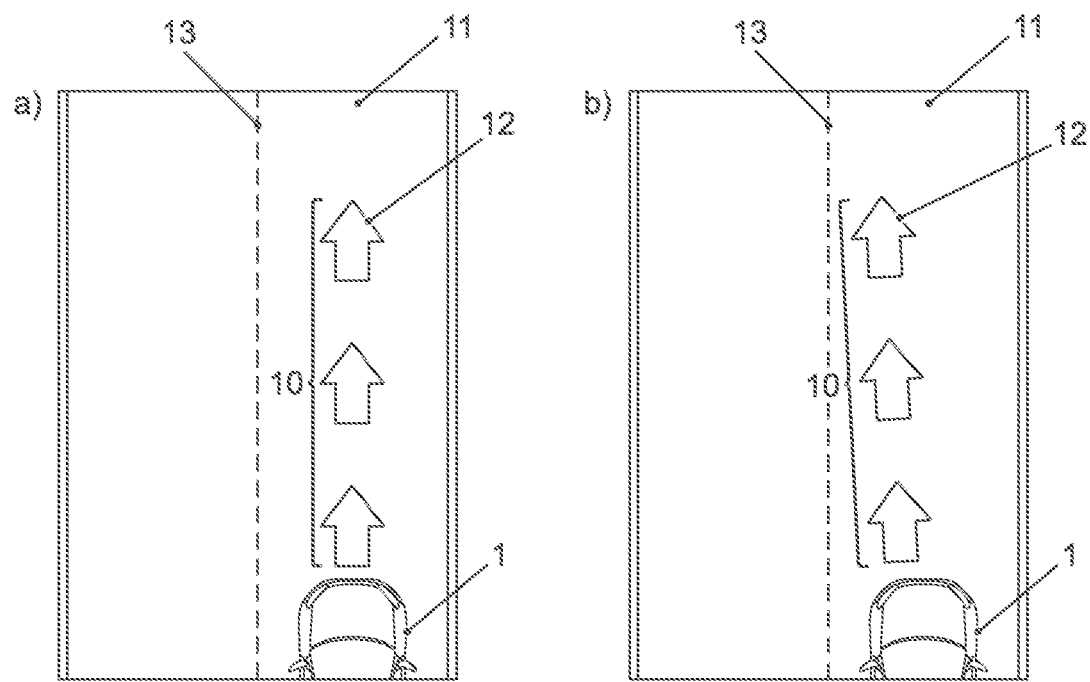
FIG. 9 illustrates a flat representation of a navigation path composed of discrete elements and with reduced width, without and with a registration error, wherein the discrete elements convey additional information.

FIG. 9 illustrates a flat representation of a navigation path composed of discrete elements and with reduced width, wherein the discrete elements convey additional information. FIG. 9a) shows the situation in the ideal condition, i.e., without registration errors. FIG. 9b) shows again here the known registration error from FIG. 6b). The division of the virtual object 10 into discrete elements 12 can be expanded by not only dividing the virtual object into sections but also providing it with additional information content with the help of symbols inherent to the individual elements 12. In FIG. 9, the symbols of the elements 12 are based on an arrow-shaped design of the elements 12. The individual arrow-shaped elements 12 are, e.g., oriented so that they follow the characteristic of the lane 11 to be marked, in particular that they also reproduce a curved characteristic of the lane 11. This type of representation also results in a smaller covering than a mere reduction of the width or a division of the virtual object 10 into discrete parts. The additional symbols also contribute to the intuitive understanding of the representation. In addition, this display is also fault-tolerant with regard to a registration error caused by pitching movements of the vehicle 1 with which up-and-down movements of the display occur. Since the person is familiar with the arrows painted on the street, he knows from experience that these arrows normally stick to the street stably. Subjectively, the driver perceives the movements of the virtual symbols less since these movements contradict the behavior to which he is accustomed.

Figure 10:
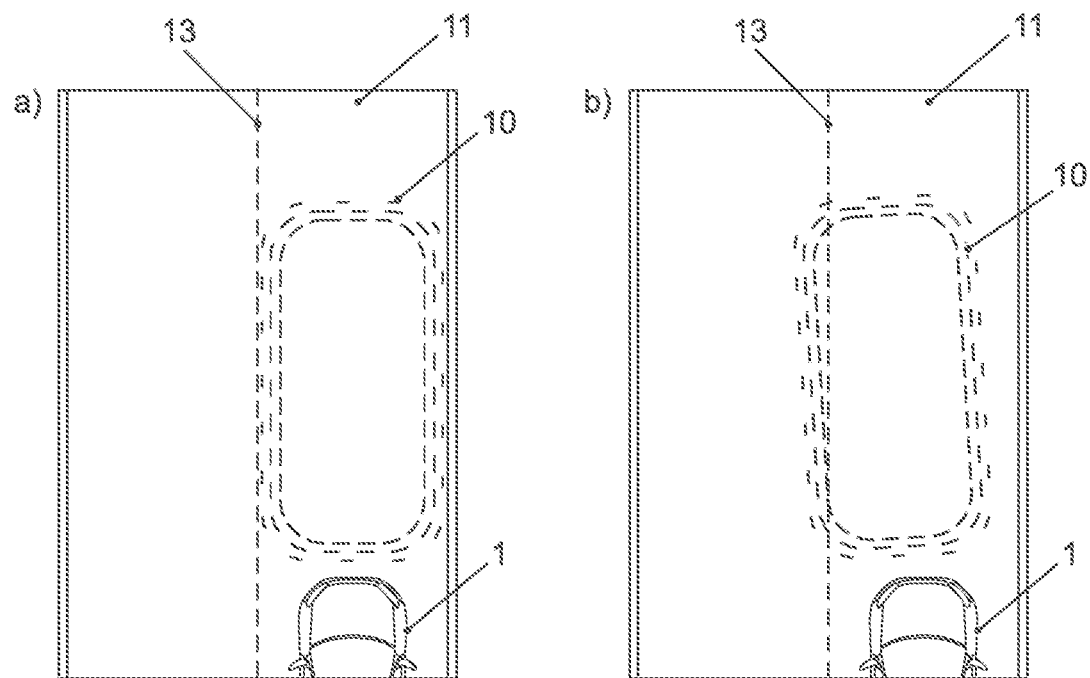
FIG. 10 illustrates a flat representation of a navigation path with fuzzy edges without and with a registration error.

FIG. 10 illustrates a flat representation of a navigation path with fuzzy edges. FIG. 10a) shows the situation in the ideal condition, i.e., without registration errors. FIG. 10b) shows once again the known registration error from FIG. 6b). Instead of changing the geometry of the virtual object 10, it is also possible to form the contours of the virtual object more softly, i.e., to provide the virtual object 10 with a fuzzy edge region. This is indicated in FIG. 10 by the dotted lines. A fuzzy representation of the contours leads to an area of the same size overlapping the lane markings 13 and protruding over the neighboring lane when the size of the virtual object 10 stays the same. However, in this case the overlap is less salient. Naturally, it is possible to form only selected edges of the virtual object 10 fuzzily.

Figure 11:
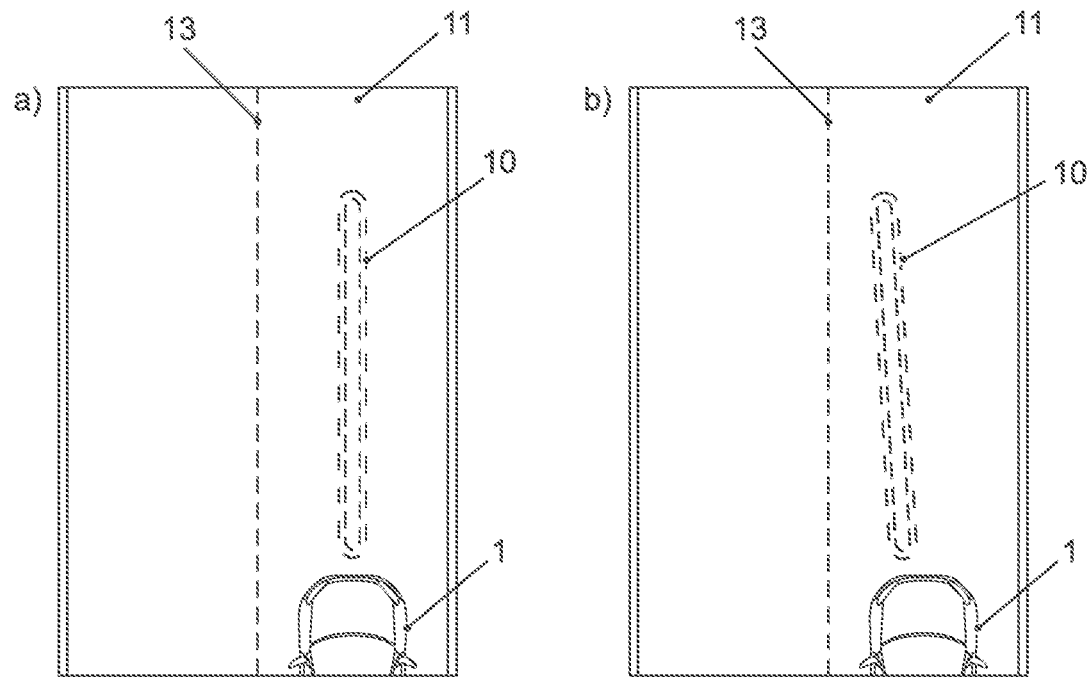
FIG. 11 illustrates a flat representation of a navigation path with fuzzy edges and reduced width, without and with a registration error.

The use of fuzzy edges represented in FIG. 10 can be combined advantageously with a reduced width of the virtual object 10. Such a flat representation of a navigation path with fuzzy edges and reduced width is pictured in FIG. 11. FIG. 11a) shows the situation in the ideal condition, i.e., without registration errors. FIG. 11b) shows once again the known registration error from FIG. 6b). In this example, the width deviates pronouncedly from the actual lane width on one hand; on the other hand, no sharp contours are present, which is also indicated by the dotted lines. This type of representation can be termed a tube representation. In contrast to the representation shown in FIG. 10, it has the additional advantage that only a very narrow part of the reality is obscured by a virtual superimposition and the virtual object 10 intersects the lane markings 13 only in the case of a pronounced registration error. When setting the width of the virtual object 10, some boundary conditions must be taken into account. Generally, it applies that the narrower the virtual object 10 is, the more fault-tolerant the augmented reality display is. It also applies that the narrower the virtual object 10 is, the less the view of the real environment is obscured by the superimposition. However, the readability of the information and the subjectively perceived graphical impression can suffer with the reduced width. In test drives, a width of 40 cm for the tube representation has proved successful. During these test drives it was also determined that only a few turning errors occurred when using the tube representation for the representation of a navigation path. The tube representation was preferred over the carpet representation by the test subjects for this purpose, in particular with limited or fluctuating sensor quality.

Figure 12:
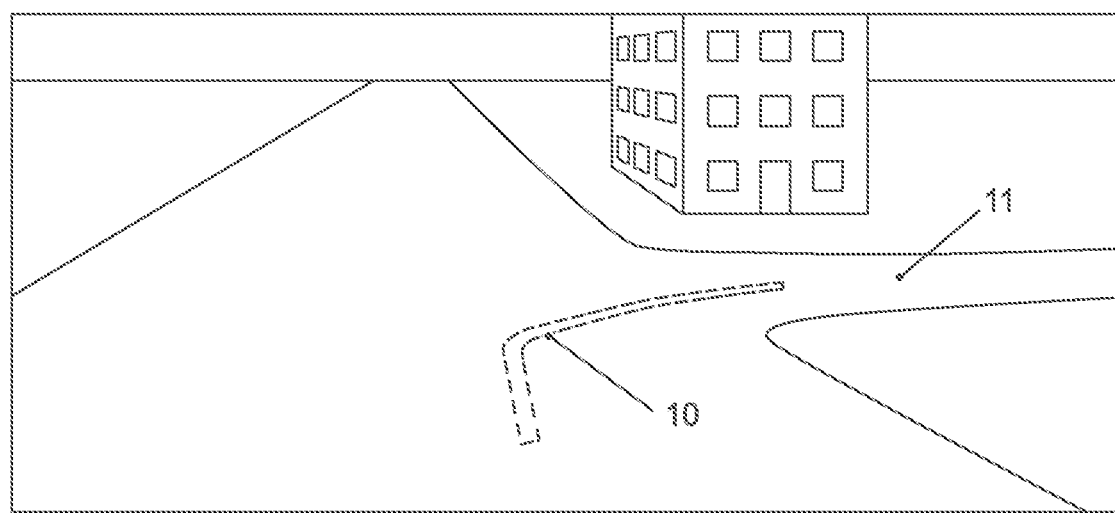
FIG. 12 shows schematically the flat representation from FIG. 11 from the perspective of the driver.

FIG. 12 shows schematically the tube representation from FIG. 11 (without registration errors) from the perspective of the driver. In front of the vehicle is a right turn. The virtual object 10, the fuzzy edges of which are indicated as before by a dotted line, follows the characteristic of the lane 11, i.e., it has a curve to the right and so marks the upcoming driving path of the vehicle.

The three described factors—abstraction from the real geometry of the lane, division of the virtual object and fuzzy representation of the contours—can also be combined. As a result, displays are developed that have additional advantages and tend to be accepted better by the driver in the context of a navigation display. For example, the individual elements 12 in FIG. 8 and FIG. 9 can have fuzzy edges on all sides or only on some sides, for example only on the edges parallel to the lane markings 13.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfil the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE SIGNS

1 Motor vehicle
2 Augmented reality head-up display device
3 Imaging unit
4 Optical module
5 Projection surface
10 Virtual object
11 Lane
12 Element of the virtual object
13 Lane marking
20 Determining a position for the virtual objection
21 Superimposing the virtual object corresponding to the determined position
30 Device
31 Input
32 Positioning unit
33 Rendering unit
34 Control unit
35 Output
36 Storage device
37 User interface
40 Device
41 Storage device
42 Processor
43 Input
44 Output
50 Navigation system
51 Environment sensor system
52 Control device
53 Network

What is claimed is:

1. A method for controlling a display of an augmented reality head-up display device in a motor vehicle with the steps:
   determining a position for a representation of a virtual object based on a road surface marking on a road in front of the motor vehicle; and
   superimposing the virtual object corresponding to the determined position of the road surface marking onto a projection surface to obtain an augmented reality display in the vehicle;
   wherein in the augmented reality display, the superimposed virtual object is one or more of laterally misaligned and rotationally misaligned relative to the road surface marking caused by misalignment registration errors between the virtual object and the road surface marking; and
   wherein the superimposed virtual object is displayed in the augmented reality display with one or more fuzzy edges to reduce a visual noticeability of the respective misalignment of the superimposed virtual object relative to the road surface marking caused by the misalignment registration errors between the virtual object and the road surface marking.

2. The method according to claim 1, wherein the virtual object marks a navigation path and the width of the virtual object is narrower than the width of the lane highlighted by the navigation path.

3. The method according to claim 1, wherein the virtual object marks a navigation path and is divided into discrete elements.

4. The method according to claim 3, wherein the discrete elements convey additional information.

5. The method according to claim 3, wherein the discrete elements have fuzzy edges.

6. A device for controlling a display of an augmented reality head-up display device in a motor vehicle wherein the device comprises a processor, having:
- an input for receiving data which allow a determination of a desired position for a representation of a virtual object based on a road surface marking in front of the motor vehicle;
- a positioning unit, configured for determining the position for the representation of the virtual object based on the data received by the input;
- a rendering unit, configured for superimposing the virtual object corresponding to the position of the road surface marking, determined by the positioning unit, on a projection surface to obtain an augmented reality display in the vehicle and to control an imaging unit of the augmented reality head-up display device accordingly;
- wherein in the augmented reality display, the superimposed virtual object is one or more of laterally misaligned and rotationally misaligned relative to the road surface marking caused by misalignment registration errors between the virtual object and the road surface marking; and
- wherein the superimposed virtual object is displayed in the augmented reality display with one or more fuzzy edges to reduce a visual noticeability of the respective misalignment of the superimposed virtual object relative to the road surface marking caused by the misalignment registration errors between the virtual object and the road surface marking.

7. The device according to claim 6, wherein the virtual object marks a navigation path and the width of the virtual object is narrower than the width of the lane highlighted by the navigation path.

8. The device according to claim 6, wherein the virtual object marks a navigation path and is divided into discrete elements.

9. The device according to claim 8, wherein the discrete elements convey additional information.

10. The device according to claim 8, wherein the discrete elements have fuzzy edges.

11. A non-transitory computer-readable storage medium with instructions that, when carried out by a computer, prompt the computer to carry out the steps of a method according to claim 1 for controlling a display of an augmented reality head-up display device for a motor vehicle.

12. An augmented reality head-up display device for a motor vehicle having a device according to claim 6.

13. A motor vehicle, having an augmented reality head-up display device according to claim 12.

14. The method according to claim 1, wherein the virtual object is displayed as a tube representation, so that only a narrow part of the augmented reality display is obscured by the superimposed virtual object.

15. The device according to claim 6, wherein the virtual object is displayed as a tube representation, so that only a narrow part of the augmented reality display is obscured by the superimposed virtual object.

16. An augmented reality head-up display device for a motor vehicle having a processor, configured to carry out the method according to claim 1 for controlling a display of an augmented reality head-up display device.

17. A motor vehicle having a device according to claim 6.

18. A motor vehicle having a processor, configured to carry out the method according to claim 1 for controlling a display of an augmented reality head-up display device.

* * * * *